(12) United States Patent
Garnitsch et al.

(10) Patent No.: US 12,447,649 B2
(45) Date of Patent: Oct. 21, 2025

(54) METHOD AND GASKET FOR PRODUCING A POLYMETHYL METHACRYLATE PLATE

(71) Applicant: Trinseo Europe GmbH, Horgen (CH)

(72) Inventors: Nikolaj Garnitsch, Horgen (CH); Simon van der Heijden, Horgen (CH)

(73) Assignee: Trinseo Europe GmbH, Horgen (CH)

( * ) Notice: Subject to any disclaimer, the term of this patent is extended or adjusted under 35 U.S.C. 154(b) by 107 days.

(21) Appl. No.: 18/036,026

(22) PCT Filed: Nov. 9, 2021

(86) PCT No.: PCT/NL2021/050687
§ 371 (c)(1),
(2) Date: May 9, 2023

(87) PCT Pub. No.: WO2022/103257
PCT Pub. Date: May 19, 2022

(65) Prior Publication Data
US 2024/0001594 A1 Jan. 4, 2024

(30) Foreign Application Priority Data
Nov. 10, 2020 (NL) .................... 2026861

(51) Int. Cl.
*B29C 39/00* (2006.01)
*B29C 33/00* (2006.01)
(Continued)

(52) U.S. Cl.
CPC ........ *B29C 39/006* (2013.01); *B29C 33/0038* (2013.01); *B29C 39/02* (2013.01); *B29C 39/22* (2013.01); *B29C 39/265* (2013.01); *B29C 39/32* (2013.01); *F16J 15/102* (2013.01); *B29K 2033/12* (2013.01); *B29L 2007/002* (2013.01)

(58) Field of Classification Search
CPC ... B29C 39/265; B29C 39/32; B29C 33/0038; B29L 2007/002; B29K 2033/12; F16J 15/102
See application file for complete search history.

(56) References Cited

U.S. PATENT DOCUMENTS

| | | | |
|---|---|---|---|
| 2,154,639 | A | 4/1939 | Rohm et al. |
| 3,639,553 | A | 2/1972 | Sueda et al. |

(Continued)

FOREIGN PATENT DOCUMENTS

| | | |
|---|---|---|
| BE | 495628 | 11/1950 |
| DE | 2346078 | 3/1975 |

(Continued)

OTHER PUBLICATIONS

Translation of DE-9205650-U1 (Year: 1992).*
Translation of WO-2005022208-A1 (Year: 2005).*

*Primary Examiner* — John J DeRusso
(74) *Attorney, Agent, or Firm* — The Webb Law Firm

(57) ABSTRACT

A method for producing a polymethyl methacrylate plate includes the steps of providing a mould that includes at least one gasket which is enclosed between two substantially parallel mould parts, introducing liquid including methyl methacrylate prepolymer and/or methyl methacrylate monomer in the mould and enabling polymerization of the liquid methyl methacrylate. A gasket is used in a mould for producing a polymethyl methacrylate plate.

21 Claims, 4 Drawing Sheets

(51) Int. Cl.
  *B29C 39/02* (2006.01)
  *B29C 39/22* (2006.01)
  *B29C 39/26* (2006.01)
  *B29C 39/32* (2006.01)
  *B29K 33/00* (2006.01)
  *B29L 7/00* (2006.01)
  *F16J 15/10* (2006.01)

(56) References Cited

U.S. PATENT DOCUMENTS

| | | | |
|---|---|---|---|
| 4,143,852 A * | 3/1979 | Wiener | B29C 33/0038 |
| | | | 249/187.1 |
| 4,889,678 A | 12/1989 | Obata et al. | |
| 5,047,199 A | 9/1991 | Leca et al. | |
| 5,281,372 A | 1/1994 | Hayashi et al. | |
| 2008/0108758 A1 * | 5/2008 | Watanabe | F16J 3/041 |
| | | | 525/420 |
| 2020/0331218 A1 * | 10/2020 | Soave | B29D 11/00009 |

FOREIGN PATENT DOCUMENTS

| | | | | |
|---|---|---|---|---|
| DE | 9205650 U1 * | 7/1992 | | |
| EP | 0027550 A2 | 4/1981 | | |
| EP | 0151818 A1 | 8/1985 | | |
| EP | 0293250 A2 | 11/1988 | | |
| EP | 0506404 A1 | 9/1992 | | |
| GB | 692406 | 6/1953 | | |
| GB | 935203 | 8/1963 | | |
| JP | 59106936 A | 6/1982 | | |
| WO | WO-2005022208 A1 * | 3/2005 | | B29C 39/006 |
| WO | 2020231253 A1 | 11/2020 | | |

* cited by examiner

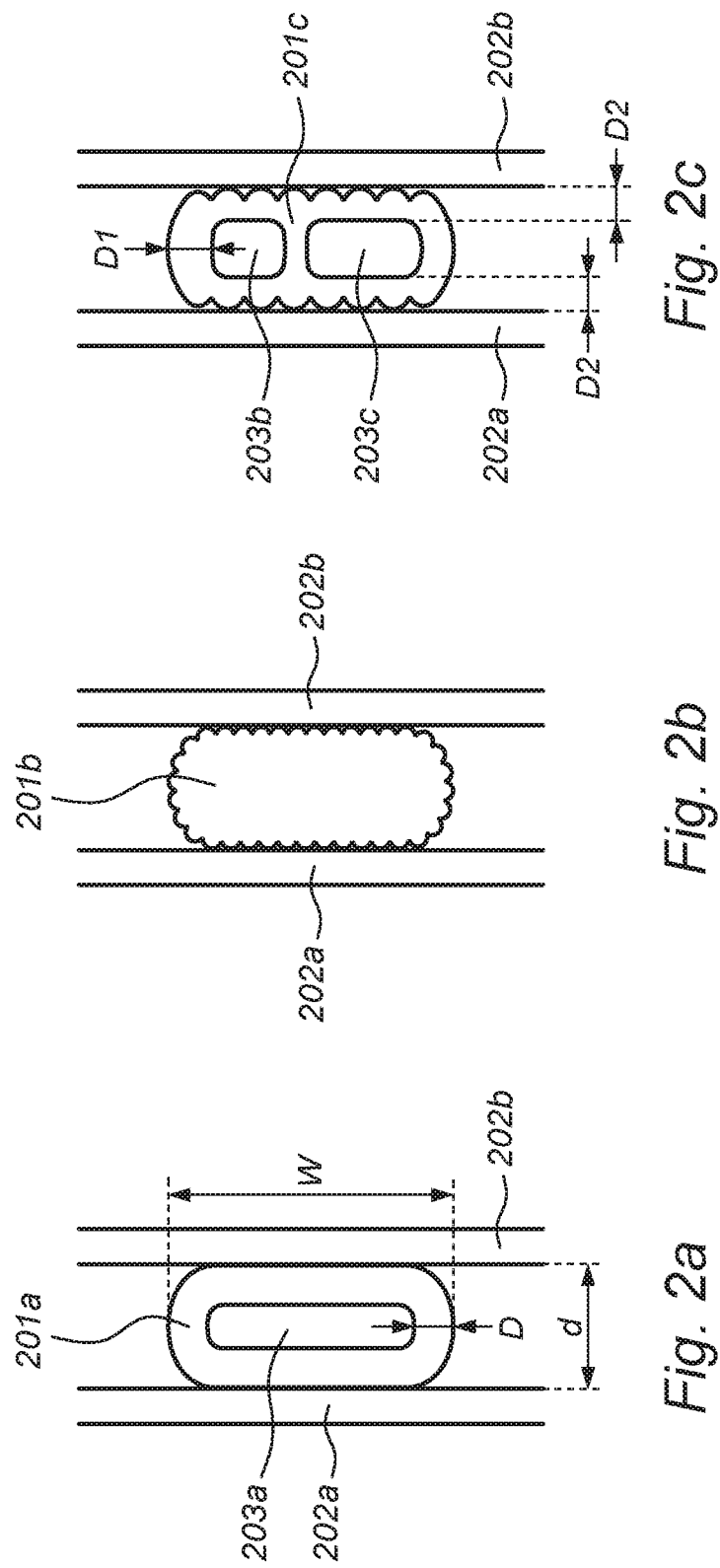

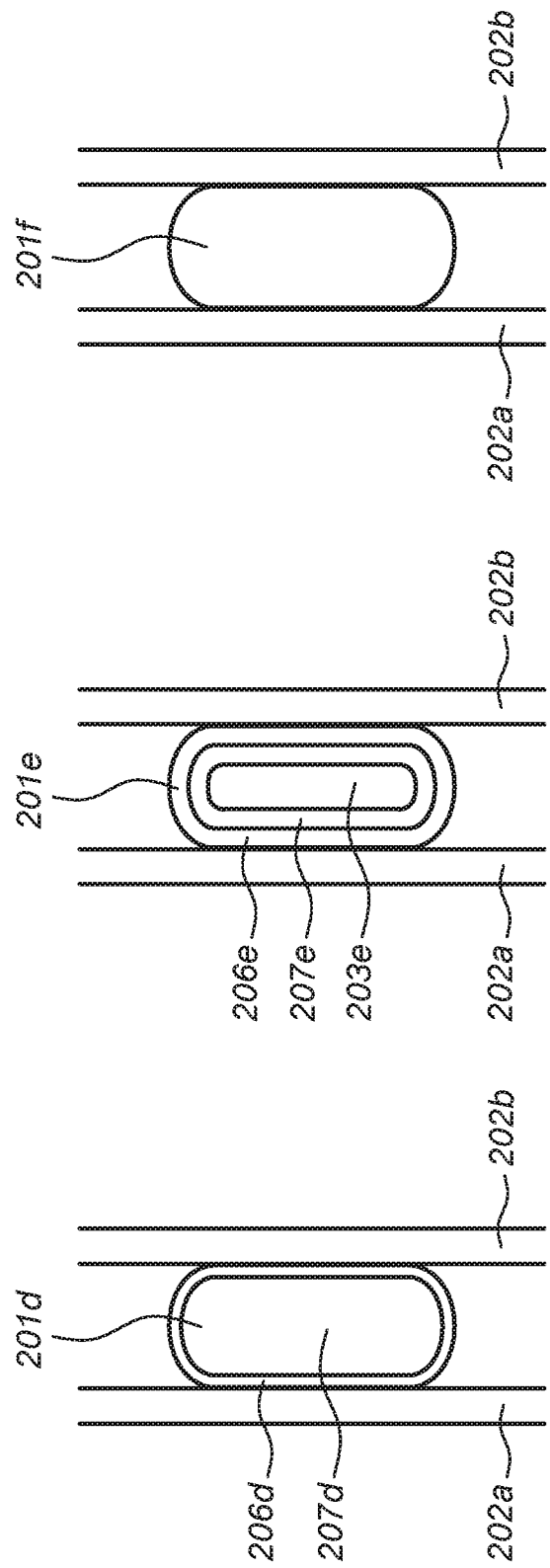

METHOD AND GASKET FOR PRODUCING A POLYMETHYL METHACRYLATE PLATE

CROSS-REFERENCE TO RELATED APPLICATIONS

This application is the United States national phase of International Application No. PCT/NL2021/050687 filed Nov. 9, 2021, and claims priority to NL Patent Application No. 2026861 filed Nov. 10, 2020, the disclosures of which are hereby incorporated by reference in their entireties.

BACKGROUND OF THE INVENTION

Field of the Invention

The invention relates to a method for producing a polymethyl methacrylate plate. The invention also relates to a polymethyl methacrylate plate produced via said method. The invention further relates to a gasket for use in a mould for producing a polymethyl methacrylate plate and to such mould.

Description of the Related Art

Polymethyl methacrylate (PMMA) is a transparent thermoplastic material which is widely used for several applications, such as for example optical applications. PMMA is popular due to its extraordinary (material)properties, for instance with respect to weatherability and scratch resistance. The material is furthermore known for its good impact strength and good chemical resistance. PMMA is available commercially in both pellet and sheet or plate form. PMMA sheets can form a lightweight or shatter-resistant alternative to glass and are also known as acrylic, acrylic glass, or plexiglass. Production of a PMMA sheet is typically done by cell casting using two parallel glass panels which are separated via a gasket, wherein said gasket is clamped in between the glass panels. Hence, the glass panels and gasket form a casting cell which can contain a casting liquid. The casting liquid, typically methyl methacrylate (MMA) monomer or MMA prepolymer, is poured between the two glass panels and is subsequently subjected to a polymerization step resulting in a polymethyl methacrylate sheet being formed within the boundaries of the gasket. The glass panels are removed after the polymerization. Conventional gaskets used for the casting of PMMA are typically made of polyvinyl chloride (PVC). After polymerization of the PMMA sheet, the gasket has to be removed from the sheet. This is typically done by cutting (or trimming) of the edges of the sheet. The gasket and some polymer scrap, which is possibly adhered to the gasket, is then separated from the final PMMA sheet. A drawback of PVC is that the (P)MMA mixes with the PVC material, making it difficult to separate the PVC and the PMMA scrap. A further drawback of the use of PVC is that the use of this type of plastic is undesired from environmental point of view since it is rather difficult to recycle PVC.

Leftover or residue containing PVC still often ends up in landfill, wherefore omitting the use of PVC would be highly desirable.

SUMMARY OF THE INVENTION

Hence, it is a goal of the invention to provide at least an alternative to the use of PVC as gasket in a mould when producing a PMMA sheet.

The invention provides thereto a method for producing a polymethyl methacrylate plate, comprising the steps of providing a mould comprising at least two mould parts, each mould part having at least one substantially flat mould surface facing an substantially flat mould surface of an opposing mould part, and wherein said mould comprises at least one gasket, which gasket is clamped in between said substantially flat mould surfaces of opposing mould parts, such that a mould cavity is defined by said mould parts and said gasket, at least partially filling the mould cavity by introducing liquid comprising methyl methacrylate prepolymer and/or methyl methacrylate monomer into the mould cavity, enabling polymerization of the methyl methacrylate prepolymer and/or methyl methacrylate monomer introduced in the mould cavity, such that a polymethyl methacrylate plate, enclosed by said gasket, is formed within said mould cavity, and removal of the assembly of the gasket and said polymethyl methacrylate plate enclosed by said gasket from the mould parts. Preferably, the gasket comprises at least one hydrocarbon-based copolymer.

The method according to the present invention is in particular a method for manufacturing a cast polymethyl methacrylate plate, i.e. a method for cell casting of a polymethyl methacrylate plate. Where the term plate is used, also a sheet is referred to. In the method according to the present invention preferably a gasket comprising at least one hydrocarbon-based copolymer is used. The gasket according to the present invention has several benefits over conventional methods which typically make use of a PVC gasket. The liquid comprising (poly)methyl methacrylate prepolymer and/or methyl methacrylate monomer is introduced into the mould cavity of the mould, such that the mould is substantially fully filled with liquid. The mould can also be referred to as casting cell. It is conceivable that the substantially flat mould surfaces facing of the opposing mould parts partially, or fully, engage another before MMA liquid is introduced in the mould. The liquid comes into direct contact with at least part of the gasket when introduced in the mould. The mould parts are removed after polymerization of the liquid. This can for example be done by removal of the clamping connection between the mould parts. A PMMA plate which is enclosed between the gasket is obtained. The PMMA plate can be at least partially bound or connected to the gasket. As mentioned above, typically the circumferential sides or edges of the casted PMMA plate are removed after the casting in order to obtain a final product in the form of an uncontaminated PMMA plate. This could be done via cutting or trimming. In particular, the gasket and part of the edges of the fabricated PMMA plate are removed. This removed scrap or residue contains PMMA from the produced plate in combination with the polymer of the gasket used in the mould, in particular a hydrocarbon-based copolymer gasket. Since the gasket according to the present invention comprises a hydrocarbon-based copolymer, the scrap in particular consists of PMMA and hydrocarbon-based copolymers. This results in the scrap being relatively easily processable for further application such as recycling. The scrap can for example be recycled and/or depolymerised. Several known techniques can be applied for the recycling and/or depolymerization of a gasket comprising at least one hydrocarbon-based copolymer. It is beneficial to apply a gasket comprising at least one hydrocarbon-based copolymer as this material may improve the mechanical properties of the recycling process, as it may for example contribute to an improved impact resistance. Since a hydrocarbon-based copolymer mainly contains hydrogen and carbon atoms, even if chemical recycling and/or combustion of the scrap or gasket is to be applied, the by-products are relatively unharmful. When comparing to a conventional PVC gasket, recycling of PVC may cause the chlorine in the polymer to react during chemical processes to produce harmful by-products which is undesired from environmental point of view. It is conceivable that the gasket is at least partially made of a hydrocarbon-based copolymer. Preferably the gasket is made of a recyclable polymer. It is also conceivable that the gasket comprises at least one hydrocarbon-based block copolymer. The hydrocarbon-based copolymers could be present in a grafted form. Hence, it is also possible that the gasket comprises at least one graft polymer, in particular at least one hydrocarbon-based graft polymer. Graft polymers have a relatively large compatibility with the base polymer. Non-limiting example of a graft polymers which could be applied in the method according to the present invention are grafted SEBS (SEBS-g-GMA) and/or polyethylene grafted with maleic anhydride. When it is referred to (PMMA) scrap, also polymer scrap, acrylic scrap or residue is meant.

The method according to the invention can also benefit from the material properties of the gasket in a further way. When the MMA liquid is introduced into the mould cavity of the mould, such that the mould is substantially fully filled with liquid, the liquid herewith comes into direct contact with at least part of the gasket when introduced in the mould. As a consequence of the direct contact, the MMA monomer or MMA prepolymer in the liquid may cause part of the gasket to dissolve within the liquid. Possibly, during production of the PMMA plate at least part of the outer surface of the gasket, which is in direct contact with the MMA liquid, will dissolved within the MMA liquid. The degree of dissolution depends, amongst others, on the temperature of the liquid and/or the contact wetting surface. A relatively strong bonding between the gasket and the plate can hence be obtained. The contact between the MMA monomer or prepolymer and the gasket may also result in a connection between the PMMA of the plate and the polymer of the gasket. Contact between the MMA monomer or prepolymer and the gasket furthermore could cause at least part of the gasket to expand or swell. Due to the swelling of the gasket, an improved sealing of the mould by the gasket can be obtained when applying the method according to the present invention. The gasket is enclosed between two substantially parallel mould parts in the mould, which mould parts are typically clampingly connected to each other. Due to the clamping configuration, swelling of at least part of the gasket will result in the gasket being pressed outwardly towards the mould parts which results in at least partial deformation of the gasket. Due to this swelling, and thus deformation, the gasket can provide an improved sealing such that leakage of liquid from the mould can be prevented.

The method according to the present invention is in particular suitable for batch casting of PMMA plates. It is however also possible to apply the method in a continuous casting process. The gasket is typically only used once, thereafter the gasket needs to be further processed, such as recycled and/or depolymerized. The panes are typically configured for repeated use. The polymerization can be performed via any of the known PMMA polymerization techniques, for example by heating of the liquid at a predetermined temperature for a predetermined time interval. An oven may possibly be used for the step of polymerization. The desired polymerization parameters such as temperature and/or time depend on several process factors and are known by a person skilled in the field. It is conceivable that the method comprises the step of degassing of liquid before the liquid is introduced into the mould and/or before polymerization is initiated. When it is referred to MMA liquid, also a syrup or fluid comprising MMA monomer and/or MMA prepolymer can be meant. A MMA prepolymer can also be referred to as PMMA prepolymer. This prepolymer can be for example prepared from inhibitor which is heated possible in combination with an additive as benzoyl peroxide, and then cooled to room temperature. A (liquid) syrup will be obtained, consisting of a solution of polymer in monomer. With respect to the mould or cell cast, each mould part typically comprises a flat inner surface facing the other mould part when clampingly connected such that a mould is formed. Such mould part may for example be a panel or a plate. When the word gasket is used within the context of the present invention, it can also be referred to a (peripheral) hank. Further regarding the terminology of the gasket, the non-limiting terms profile, strand, cable, wire or rope may also be used within the context of this invention. More in particular, for example a profile or rope comprising a hydrocarbon-based polymer may be used to form a gasket according to the present invention.

In a preferred embodiment, the gasket comprises a copolymer of ethylene and methacrylic acid. Such copolymer is for example known under the commercial name Surlyn. The use of a gasket comprising a copolymer of ethylene and methacrylic acid still allows for recycling and/or depolymerisation of the PMMA scrap.

In another preferred embodiment of the invention, the gasket comprises at least one modified polyolefin. Non-limiting examples of modified polyolefins are for example ethylene butyl acrylate (EBA), ethylene-vinyl acetate (EVA) and/or polyethylene (PE) copolymer. In yet another preferred embodiment, the gasket comprises at least one modified polystyrene. Non-limiting examples of modified polystyrene are styrene-butadiene-styrene (SBS), styrene-isoprene-styrene (SIS) and/or styrene-ethylene/butylene-styrene (SEBS). It is also conceivable that the gasket comprises at least one modified polyolefin and/or at least one modified polystyrene. Hence, possibly, the gasket comprises ethylene butyl acrylate (EBA), ethylene-vinyl acetate (EVA), styrene-butadiene-styrene (SBS), styrene-isoprene-styrene (SIS) and/or styrene-ethylene/butylene-styrene (SEBS).

It is further conceivable that the gasket comprises at least one biopolymer and/or that the gasket is at least partially made of biopolymers. Hence, it is possible that at least part of the gasket comprises natural polymers such as natural rubber(s). The natural polymers could for example be produced by the cells of living organisms. Such embodiment would be beneficial from environmental point of view.

The gasket preferably substantially consists of a polymer, or polymers, comprising carbon and hydrogen atoms. It is further preferred that the gasket is substantially free of halogens, sulfur and/or nitrogen. It is beneficial if the gasket is substantially free of halogen such as fluorine and/or chlorine and possibly also bromine and/or iodine. It is beneficial for the further processing after use if the gasket is substantially free of halogens, sulfur and/or nitrogen. For mechanical recycling, chemical recycling and combustion it would be beneficial if the gasket is substantially free of the mentioned components. The presence of oxygen atoms would typically not negatively affect the recycling process. Hence, it is possible that the gasket comprises a fraction of oxygen atoms.

In yet another preferred embodiment, the gasket comprises at least one compatibilizer, in particular a non-reactive compatibilizer. A compatibilizer is compatible with a number of polymers, wherefore they benefit that they could be involved in a conventional recycling process. In addition to this, the presence of at least one compatibilizer may enable that impurities, typically initiating from other polymers such as polyethylene terephthalate (PET), acrylonitrile butadiene styrene (ABS), styrene-acrylonitrile (SAN) or the like, will not lead to negative effects of the conventional recycling process of for example polyolefins and/or polystyrenes.

The gasket possibly comprises at least one additive. The additive is preferably configured to impede dissolution of polymethyl methacrylate of the gasket into the liquid comprising methyl methacrylate prepolymer and/or methyl methacrylate monomer during step B and/or step C). It is also conceivable that the gasket comprises a polymer which is co-extruded with at least one additive. This embodiment allows that the acrylic grade of the gasket can be modified in order to further adapt the material properties of the gasket. It is for example possible that said additive influences the melting properties of the gasket, such that dissolution of polymer material of the gasket in the MMA can be prevented or at least impeded. It is also possible that an additive is used which affects the texture, flexibility and/or impact resistance of the gasket. This may positively influence the deformability, sealing capacity and/or workability of the gasket. It is also possible that at least one colouring additive is applied which affects the colour of the gasket. However, the gasket could also be a substantially transparent gasket. Non-limiting examples of additives which can be used are a co-polymer, a plasticizer, an impact modifier, a polymerization primer and/or a resin. It is for example conceivable that polybutyl acrylate (PBA) and/or polyvinylidene fluoride (PVDF) are used as additive. Further non-limiting examples of additives which can be applied in the method according to the present invention are polyethylene (PE) and/or polypropylene (PP). It is also possible that the gasket comprises at least one low-density polyethylene (LDPE). This could for example be LDPE comprising 2 to 10 wt % EVA. Yet other possible additives are polytetrafluoroethylene (PTFE), synthetic rubber and fluoropolymer elastomers such as Viton, fluoroelastomers and/or silicone- and/or silane-based additives. The use of said possible additives still allows for recycling and/or depolymerisation of the PMMA scrap. However, an extra additional purification step might be required in order to obtain the depolymerized product of the additive from the scrap. The amount of additive applied in the gasket can for example be between 0.5 and 90 wt %. It is in particular conceivable that the amount of additive applied in the gasket is between 5 and 50 wt %, in particular between 10 and 40 wt %, more in particular between 20 and 30 wt %.

In a further preferred embodiment of the method is a gasket used wherein at least part of the gasket is hollow. The gasket used may for example be a substantially tubular gasket. This embodiment is beneficial due to less material being required, resulting consequently in that less residue or scrap is left over. The gasket being at least partially hollow also benefits of more flexibility, making the gasket better workable for example during construction of the mould and/or during introducing liquid in the mould and/or spreading the liquid within the mould. A further benefit of at least part of the gasket being hollow is that such gasket deforms more easily compared to a solid gasket resulting in that a larger contact area between the gasket and the parallel mould parts during use can be obtained. A larger contact area between the gasket and the mould parts will provide a more stable mould configuration and may therefore result in that leakages of liquid MMA prepolymer during the production of the plate can be prevented. In practice, the width-to-depth ration of the gasket may increase for this embodiment when the gasket is (clampingly) engaged between two substantially parallel mould parts. A larger contact area between the gasket and the mould parts will provide a more stable mould configuration resulting in that leakages of liquid MMA prepolymer during the production of the plate can be prevented. The gasket can furthermore be at least partially flexible. This may positively contribute to the ease of use of the gasket. The gasket may have an elongated, preferably oval or rectangular, cross-section. The gasket may also be a substantially annular gasket. Non-limiting examples are shown in the figures.

In a further possible of the gasket according to the present invention, at least part of the outer surface of the gasket is profiled. Such embodiment is relatively easy to manufacture and it may improve sealing between the gasket and the mould due to that a larger contact area between the gasket and a plate can be obtained. It may further enhance the bonding between the PMMA plate and the gasket. The outer surface of the gasket may for example be at least partially roughened.

It is conceivable that the width-to-depth ratio of the gasket when enclosed between two substantially parallel mould parts of a mould for producing a polymethyl methacrylate plate is at least 1.5, preferably at least 2, more preferably at least 2.5. This embodiment provides a relatively stable configuration of the mould. The gasket is preferably made of a polymer having a relatively good deformability. For such embodiment, the width-to-depth ration of the gasket in its initial form is typically lower than the width-to-depth ration when enclosed between the two substantially parallel mould parts of a mould for producing a PMMA plate. This is beneficial for the leak-tightness of the mould configuration.

The gasket may further be enclosed by at one sleeve, in particular a polymer sleeve. The sleeve may for example comprise polyethylene, such as but not limited to HDPE, LDPE and/or LLDPE. The sleeve can substantially fully enclose the gasket; hence, the gasket can be fully surrounded by the sleeve. The sleeve can be attached around the gasket and/or wrapped around the gasket. Due to the sleeve enclosing the gasket, the use of an adhesive is generally not required. The sleeve preferably form fittingly encloses the gasket. In such embodiment, the sleeve will not negatively affect the polymerization process. At least part of the outer surface of the sleeve could possibly be profiled.

In a preferred embodiment, the gasket is at least partially made of a recycled material. It is also possible that the gasket is substantially entirely made of recycled material(s). Such embodiment would be beneficial from environmental point of view. By using recycled materials, such as recycled polymers, the use of virgin plastic can, at least partially, be omitted. It is also possible that the gasket comprises both virgin and recycled polymers. Virgin polymers may for example contribute to the strength of the gasket.

During polymerization of the methyl methacrylate prepolymer and/or methyl methacrylate monomer, the opposing mould surfaces of the mould typically have a substantially parallel orientation. This will contribute to the provision of a uniform PMMA plate. Typically, during the polymerization, the gasket is bound to the polymethyl methacrylate plate.

The gasket can me made via an extrusion process. It is also conceivable that the gasket comprises extruded polymers. An extraction process is beneficial for the efficiency of the production and enables the production continuous shapes in varying lengths and/or thicknesses. It is also conceivable that the gasket is made of co-extruded polymers. The preferred thickness of the gasket typically in the range of 2 to 30 mm, for example in the range of 2 to 15 mm or in the range of 10 to 30 mm.

The method may further comprise the step of cutting at least one and preferably each edge parts of the polymethyl methacrylate plate such that at least the gasket is removed from the plate. Hence, a plate of casted PMMA is obtained. This can be done via cutting or trimming. In particular, the gasket and part of the edges of the fabricated PMMA plate are removed. This removed scrap or residue contains PMMA from the produced plate in combination with polymer material of the gasket used in the mould. Typically, at least one and preferably each edge part of the polymethyl methacrylate plate is cut such that both the gasket and a peripheral portion of the polymethyl methacrylate plate, bound to said gasket, are removed.

The invention also related to a polymethyl methacrylate plate produced via the method according to the present invention. Further the invention relates to a gasket for use in a mould for producing a polymethyl methacrylate plate via casting, and preferably via the method according to the present invention. The gasket can be any of the disclosed gaskets. The invention also relates to an assembly of at least part of a gasket according to the present invention and at least part of a polymethyl methacrylate plate. It is in particular referred to scrap, or residue, obtained by trimming a PMMA plate produced via the method according to the present invention according to any of the embodiments described above. The scrap can be a valuable product, since its composition allows it being subjectable to recycling and/or depolymerisation. The scrap may even be recycled and/or depolymerized and subsequently applied for the production of a new gasket for use in a similar method.

The invention further relates to a mould for producing a polymethyl methacrylate plate, preferably via a method as described above, comprising a gasket as described above, wherein the gasket is enclosed between two substantially parallel mould parts. The mould may further comprise at least one clamping element configured for providing a clamping engagement between the two parallel mould parts. Each mould part could have at least one substantially flat mould surface facing a substantially flat mould surface of an opposing mould part. The gasket can be clamped or clampable in between said substantially flat mould surfaces of opposing mould parts, such that a mould cavity is defined by said mould parts and said gasket. Preferably, the gasket comprises at least one hydrocarbon-based copolymer. The gasket can be a gasket according to any of the described embodiments.

The invention will be further elucidated based upon the following non-limitative clauses.

1. Method for producing a polymethyl methacrylate plate, comprising the steps of:
    A) providing a mould comprising at least two mould parts, each mould part having at least one substantially flat mould surface facing an substantially flat mould surface of an opposing mould part, and wherein said mould comprises at least one gasket, which gasket is clamped in between said substantially flat mould surfaces of opposing mould parts, such that a mould cavity is defined by said mould parts and said gasket,
    B) at least partially filling the mould cavity by introducing liquid comprising methyl methacrylate prepolymer and/or methyl methacrylate monomer into the mould cavity,
    C) enabling polymerization of the methyl methacrylate prepolymer and/or methyl methacrylate monomer introduced in the mould cavity, such that a polymethyl methacrylate plate, enclosed by said gasket, is formed within said mould cavity, and
    D) removal of the assembly of the gasket and said polymethyl methacrylate plate enclosed by said gasket from the mould parts, characterized in that the gasket comprises at least one hydrocarbon-based copolymer.
2. Method according to clause 1, wherein the gasket comprises at least one hydrocarbon-based block copolymer and/or wherein the gasket comprises at least one hydrocarbon-based graft copolymer.
3. Method according to any of the previous clauses, wherein the gasket comprises a copolymer of ethylene and methacrylic acid.
4. Method according to any of the previous clauses, wherein the gasket comprises at least one modified polyolefin.
5. Method according to any of the previous clauses, wherein the gasket comprises at least one modified polystyrene.
6. Method according to any of the previous clauses, wherein the gasket comprises ethylene butyl acrylate (EBA), ethylene-vinyl acetate (EVA), styrene-butadiene-styrene (SBS), styrene-isoprene-styrene (SIS) and/or styrene-ethylene/butylene-styrene (SEBS).
7. Method according to any of the previous clauses, wherein the gasket comprises at least one biopolymer.
8. Method according to any of the previous clauses, wherein the gasket is substantially free of halogens, sulfur and/or nitrogen.
9. Method according to any of the previous clauses, wherein the gasket comprises at least one compatibilizer, in particular a non-reactive compatibilizer.
10. Method according to any of the previous clauses, wherein the gasket comprises at least one additive configured to impede dissolution of the polymer material of the gasket into the liquid comprising methyl methacrylate prepolymer and/or methyl methacrylate monomer during step B and/or step C).
11. Method according to any of the previous clauses, wherein the gasket has an elongated cross-section, and preferably an oval or rectangular cross-section.
12. Method according to any of the previous clauses, wherein at least part of the gasket is hollow.
13. Method according to any of the previous clauses, wherein the gasket is an annular gasket.
14. Method according to any of the previous clauses, wherein at least part of the outer surface of the gasket is profiled.
15. Method according to any of the previous clauses, wherein the width-to-depth ratio of the gasket when clamped in between two substantially flat mould part surfaces is at least 1.5, preferably at least 2, more preferably at least 2.5.
16. Method according to any of the previous clauses, wherein at least one sleeve encloses the gasket.
17. Method according to any of the previous clauses, wherein the gasket is made of a recycled material.
18. Method according to any of the previous clauses, wherein opposing mould surfaces of the mould have a substantially parallel orientation, at least during step C).

19. Method according to any of the previous clauses, wherein during step C) the gasket is bound to the polymethyl methacrylate plate.
20. Method according to any of the previous clauses, wherein the gasket is made via an extrusion process.
21. Method according to any of the previous clauses, further comprising step E), which comprises the step of cutting at least one and preferably each edge part of the polymethyl methacrylate plate such that at least the gasket is removed from the plate.
22. Method according to clause 21, wherein during step E) at least one and preferably each edge part of the polymethyl methacrylate plate is cut such that both the gasket and a peripheral portion of the polymethyl methacrylate plate, bound to said gasket, are removed.
23. Polymethyl methacrylate plate produced via the method of any of clauses 1-22.
24. Gasket for use in a mould for producing a polymethyl methacrylate plate via the method of any of clauses 1-22.
25. Assembly of at least part of a gasket according clause 24 and at least part of a polymethyl methacrylate plate bound to said gasket.
26. Mould for use in a method for producing a polymethyl methacrylate plate, preferably a method according to any of clauses 1-22, comprising at least two mould parts, each mould part having at least one substantially flat mould surface facing an substantially flat mould surface of an opposing mould part, and wherein said mould comprises at least one gasket, which gasket is clamped or clampable in between said substantially flat mould surfaces of opposing mould parts, such that a mould cavity is defined by said mould parts and said gasket, characterized in that the gasket comprises at least one hydrocarbon based copolymer.

BRIEF DESCRIPTION OF THE DRAWINGS

The invention will be elucidated on the basis of non-limitative exemplary embodiments shown in the following figures, in which:

FIGS. 2a-2f show schematic representations of cross sections of possible embodiments of gaskets according to the present invention.

DESCRIPTION OF THE INVENTION

Within these figures, similar reference numbers correspond to similar or equivalent elements or features.

Figure 1B:
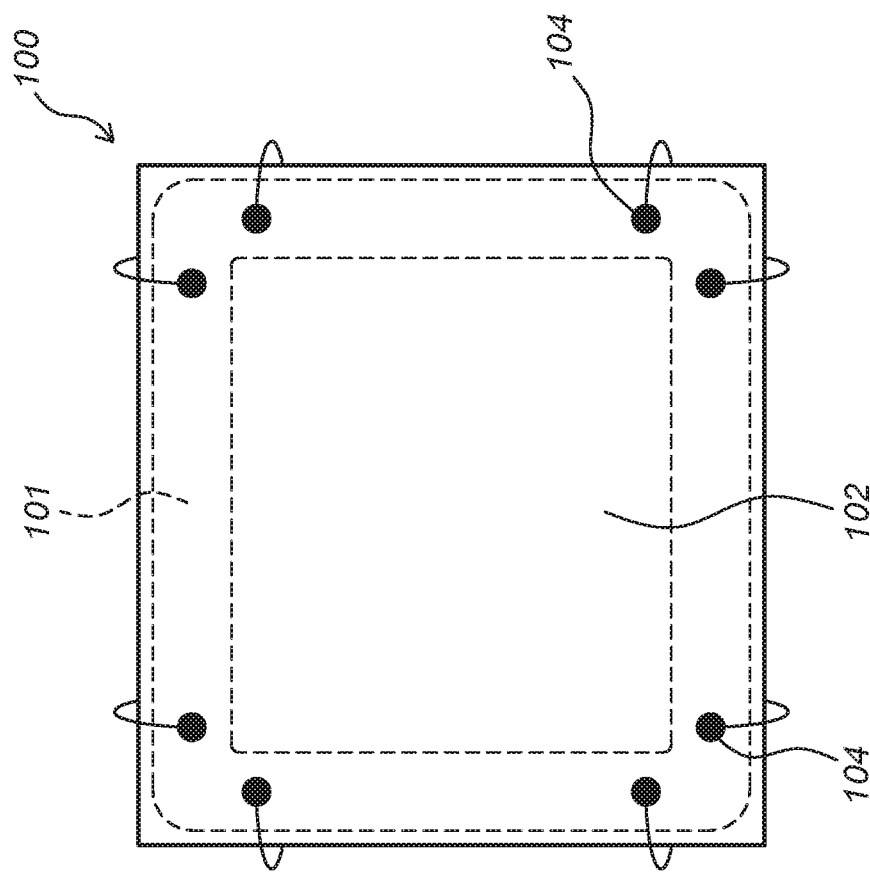
FIGS. 1a and 1b show a schematic representation of a mould for producing a polymethyl methacrylate plate (not shown) according to the present invention for use in the method according to the present invention.
Figure 1A:
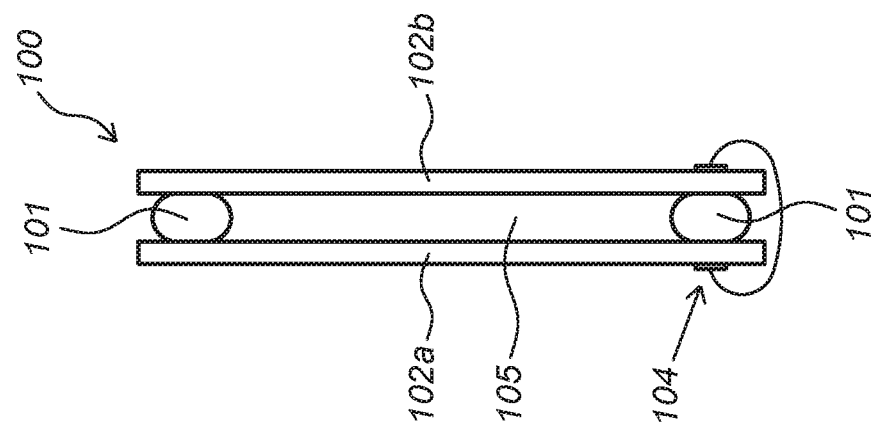

FIGS. 1a and 1b show a schematic representation of a mould 100 for producing a polymethyl methacrylate plate (not shown) according to the present invention for use in the method according to the present invention. FIG. 1a shows a side view of the mould 100, where FIG. 1b shows a top view. The mould 100 comprises two substantially parallel mould parts, in particular panels 102a, 102b preferably glass panels 102, and gasket 101. The substantially annular gasket 101 is enclosed between two substantially parallel panels 102a, 102b. The gasket 101 is clamped between the panels 102a, 102b via multiple clamping elements 104. Introduction of liquid comprising methyl methacrylate prepolymer and/or methyl methacrylate monomer into the mould 100 can be done via conventional methods. The liquid can for example be introduced into the receiving space 105 defined by the mould 100 before the panels 102a, 102b and the gasket 101 are fully clampingly connected via the clamping elements 104.

FIGS. 2a-2f show schematic representations of cross sections of possible embodiments of gaskets 201a, 201b, 201c, 201d, 201e, 201f according to the present invention. Each gasket 201a, 201b, 201c, 201d, 201e, 201f is enclosed between two parallel (glass) panels 202a, 202b.

FIG. 2a shows a gasket 201a according to the present invention. The gasket 201a shown is a substantially tubular gasket 201a. The wall of the gasket 201a encloses a hollow space 203a. The wall thickness D of the gasket 201a is substantially constant over the entire gasket 201a. It is however, also conceivable that the wall thickness locally varies, for example over the length and/or width of the gasket 201a. The width-to-depth ratio of the gasket is about 2, hence the width w of the gasket 201a is about twice the length of the depth d of the gasket 201a in the shown position wherein the gasket 201a is enclosed between the panels 202a, 202b.

FIG. 2b shows a gasket 201b wherein the outer surface of the gasket 201b is profiled. The outer surface of the gasket 201b comprises a (regular) pattern of (little) protrusions.

FIG. 2c shows yet another embodiment of a hollow gasket 201c having an outer surface which is partially profiled. The profiling is present at the areas of the gasket 201c which are in contact with the panels 202a, 202b. The gasket 201c comprises two hollow spaces 203b, 203c. The wall thickness D1 of the wall facing inwardly is larger than the wall thickness D2 of the wall facing towards the parallel panels 202a, 202b. Swelling, or expanding of the gasket 201c may cause the area of the hollow spaces 203b, 203c to reduce.

FIG. 2d shows yet another embodiment of a gasket 201d according to the present invention, which is enclosed between the panels 202a, 202b. The gasket 201d is enclosed by a sleeve 206d. Hence, in this embodiment the gasket 201d comprises a polymer core 207d which is enclosed by a polymer sleeve 206d, wherein the core 207d and the sleeve 206d are made of another polymer material. The sleeve 206d form fittingly encloses the gasket 201d.

FIG. 2e shows another possible embodiment of a gasket 201e. The gasket 201e comprises an inner layer 207e and an outer layer 206e. The inner layer 207e is formed by the basic structure of the gasket 201e. The outer layer 206e encloses the gasket 201e. The wall of the gasket 201e encloses a hollow space 203e.

FIG. 2f shows a further possible embodiment of a gasket 201f according to the present invention. The gasket 201f is a substantially solid gasket 201f.

Figure 3A:
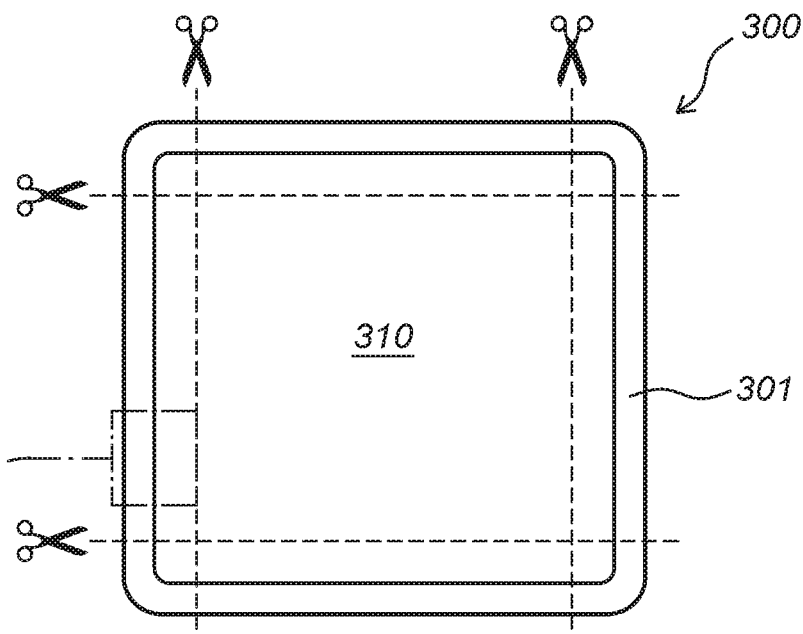
FIGS. 3a and 3b show a PMMA plate produced via a method according to the present invention.

FIG. 3a show a PMMA plate 300 produced via a method according to the present invention. The panels of the mould are removed in the shown embodiment, such that a PMMA plate 310 which is enclosed by the gasket 301 remains. In order to provide a PMMA plate 310 which is usable for varies applications it is desired that the circumferential sides or edges of the plate 310 are removed. The cutting lines in the figure indicate where the plate 310 for example can be trimmed. The removed gasket 301 and part of the PMMA plate 310 form PMMA scrap.

Figure 3B:
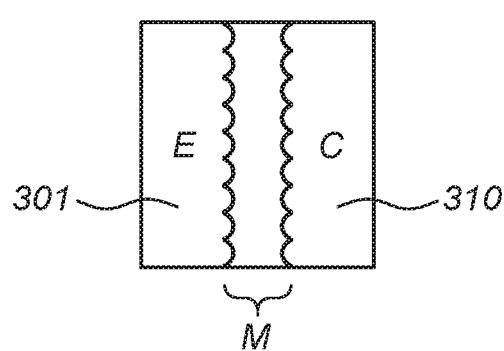

FIG. 3b shows a detailed view of an edge part of the PMMA plate 310 shown in FIG. 3a. Hence, FIG. 3b show part of the scrap or residue formed after trimming. The figure shows that the MMA monomer or MMA prepolymer before polymerization has caused part of the polymer of the gasket 301 to dissolve in the MMA liquid. Hence, after polymerization a region M comprising a mixture of cast PMMA (C) of the plate 310 and extruded polymer(s) (E) of the gasket 301 is obtained.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application. The gasket as shown in the figures can be made of any of the disclosed polymer-based materials.

The invention claimed is:

1. A method for producing a polymethyl methacrylate plate, comprising the steps of:
    a) providing a mould comprising at least two mould parts, each mould part having at least one substantially flat mould surface facing a substantially flat mould surface of an opposing mould part, and wherein said mould comprises at least one gasket, which gasket is clamped in between said substantially flat mould surfaces of opposing mould parts, such that a mould cavity is defined by said mould parts and said gasket,
    b) at least partially filling the mould cavity by introducing liquid comprising methyl methacrylate prepolymer and/or methyl methacrylate monomer into the mould cavity,
    c) enabling polymerization of the methyl methacrylate prepolymer and/or methyl methacrylate monomer introduced in the mould cavity, such that a polymethyl methacrylate plate, enclosed by said gasket, is formed within said mould cavity, and
    d) removal of the assembly of the gasket and said polymethyl methacrylate plate enclosed by said gasket from the mould parts,
    wherein the gasket comprises at least one hydrocarbon-based copolymer, and
    wherein the gasket comprises a copolymer of ethylene and methacrylic acid.

2. The method according to claim 1, wherein the gasket comprises at least one hydrocarbon-based block copolymer and/or wherein the gasket comprises at least one hydrocarbon-based graft copolymer.

3. The method according to claim 1, wherein the gasket comprises at least one modified polyolefin.

4. The method according to claim 1, wherein the gasket comprises at least one modified polystyrene.

5. The method according to claim 1, wherein the gasket comprises ethylene butyl acrylate (EBA), ethylene-vinyl acetate (EVA), styrene-butadiene-styrene (SBS), styrene-isoprene-styrene (SIS) and/or styrene-ethylene/butylene-styrene (SEBS).

6. The method according to claim 1, wherein the gasket comprises at least one biopolymer.

7. The method according to claim 1, wherein the gasket is substantially free of halogens, sulfur and/or nitrogen.

8. The method according to claim 1, wherein the gasket comprises at least one compatibilizer.

9. The method according to claim 1, wherein the gasket comprises at least one additive configured to impede dissolution of the polymer material of the gasket into the liquid comprising methyl methacrylate prepolymer and/or methyl methacrylate monomer during step B and/or step C).

10. The method according to claim 1, wherein the gasket has an elongated cross-section.

11. The method according to claim 1, wherein at least part of the gasket is hollow.

12. The method according to claim 1, wherein the gasket is an annular gasket.

13. The method according to claim 1, wherein at least part of the outer surface of the gasket is profiled.

14. The method according to claim 1, wherein the width-to-depth ratio of the gasket when clamped in between two substantially flat mould part surfaces is at least 1.5.

15. The method according to claim 1, wherein at least one sleeve encloses the gasket.

16. The method according to claim 1, wherein the gasket is made of a recycled material.

17. The method according to claim 1, wherein opposing mould surfaces of the mould have a substantially parallel orientation, at least during step C).

18. The method according to claim 1, wherein during step C) the gasket is bound to the polymethyl methacrylate plate.

19. The method according to claim 1, wherein the gasket is made via an extrusion process.

20. The method according to claim 1, further comprising step E), which comprises the step of cutting at least one edge part of the polymethyl methacrylate plate such that at least the gasket is removed from the plate.

21. The method according to claim 20, wherein during step E) at least one edge part of the polymethyl methacrylate plate is cut such that both the gasket and a peripheral portion of the polymethyl methacrylate plate, bound to said gasket, are removed.

* * * * *